United States Patent [19]
Lucas et al.

[11] Patent Number: 5,854,920
[45] Date of Patent: Dec. 29, 1998

[54] METHOD AND APPARATUS FOR MANIPULATING A CARRY/BORROW BIT TO NUMERICALLY ADJUST AND IMMEDIATE VALUE OF AN INSTRUCTION DURING EXECUTION

[75] Inventors: Brian G. Lucas, Barrington, Ill.; William C. Moyer, Dripping Springs, Tex.

[73] Assignee: Motorola, Inc., Schaumburg, Ill.

[21] Appl. No.: 835,371

[22] Filed: Apr. 7, 1997

[51] Int. Cl.[6] ............................................. G06F 9/302
[52] U.S. Cl. ................................................... 395/562
[58] Field of Search .................................... 395/562, 567

[56] References Cited

U.S. PATENT DOCUMENTS 3,909,789  9/1975  Holtey et al. ............................ 395/562
4,377,846  3/1983  Yoshida ................................... 395/562

OTHER PUBLICATIONS

Motorola,*MC68030 Enhanced 32-bit Microprocessor User's Manual*, second edition, 1989, pp. 3–20 through 3–23 and 3–178 through 3–181.

*Primary Examiner*—Richard L. Ellis
*Attorney, Agent, or Firm*—Susan C. Hill

[57] ABSTRACT

Method and apparatus for adjusting the range of a data processor instruction field for a data processor (10). The present invention allows the range of a data processor instruction field to be adjusted without requiring decode of the instruction field and without requiring the instruction field value to be modified. In one embodiment, a data processor (10) uses the value of the carry-in/borrow bit (60) provided to an arithmetic unit (30) to selectively adjust the range of the immediate data operand for certain instructions, such as, for example, add immediate (ADDI) and subtract immediate (SUBI).

30 Claims, 6 Drawing Sheets

| INSTRUCTION MNEMONIC | INSTRUCTION FORMAT | INSTRUCTION DESCRIPTION | VALUE OF CARRY-IN/BORROW | OPERATION |
|---|---|---|---|---|
| ADD | SEE FIG.5 | ADD WITHOUT USING AN IMMEDIATE FIELD IN THE INSTRUCTION | 0 | RX ← RX + RY |
| ADDI | SEE FIG.6 | ADD USING AN IMMEDIATE FIELD IN THE INSTRUCTION | 1 | RX ← RX + UNSIGNED 0IMM5 |
| SUB | SEE FIG.7 | SUBTRACT WITHOUT USING AN IMMEDIATE FIELD IN THE INSTRUCTION | 1 | RX ← RX − RY |
| SUBI | SEE FIG.8 | SUBTRACT USING AN IMMEDIATE FIELD IN THE INSTRUCTION | 0 | RX ← RX − [UNSIGNED 0IMM5] |
| RSUB | SEE FIG.9 | REVERSE SUBTRACT WITHOUT USING AN IMMEDIATE FIELD IN THE INSTRUCTION | 1 | RX ← RY − RX |
| RSUBI | SEE FIG.10 | REVERSE SUBTRACT USING AN IMMEDIATE FIELD IN THE INSTRUCTION | 1 | RX ← [UNSIGNED IMM5] − RX |

*FIG.4*

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 1 | 1 | 1 | 0 | 0 | \multicolumn{4}{c}{REGISTER Y} | \multicolumn{4}{c}{REGISTER X} |

INSTRUCTION FIELDS:

REGISTER X FIELD – SPECIFIES REGISTER RX.
    0000 – REGISTER R0
    0001 – REGISTER R1
         ⋮
    1111 – REGISTER R15

REGISTER Y FIELD – SPECIFIES REGISTER RY.
    0000 – REGISTER R0
    0001 – REGISTER R1
         ⋮
    1111 – REGISTER R15

*FIG. 5*

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 1 | 0 | 0 | 0 | 0 | \multicolumn{5}{c}{OIMM5} | \multicolumn{4}{c}{REGISTER X} |

INSTRUCTION FIELDS:

REGISTER X FIELD – SPECIFIES REGISTER RX.
    0000 – REGISTER R0
    0001 – REGISTER R1
         ⋮
    1111 – REGISTER R15

OIMM5 FIELD – SPECIFIES IMMEDIATE VALUE TO BE ADDED TO RX. NOTE THE BINARY ENCODING IS OFFSET BY 1 FROM THE ACTUAL VALUE TO BE ADDED.
    00000 – ADD 1
    00001 – ADD 2
         ⋮
    11111 – ADD 32

*FIG. 6*

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 1 | 0 | 1 | REGISTER Y ||||  REGISTER X ||||

INSTRUCTION FIELDS:

REGISTER X FIELD - SPECIFIES REGISTER RX.
        0000 - REGISTER R0
        0001 - REGISTER R1
              ⋮
        1111 - REGISTER R15

REGISTER Y FIELD - SPECIFIES REGISTER RY.
        0000 - REGISTER R0
        0001 - REGISTER R1
              ⋮
        1111 - REGISTER R15

*FIG. 7*

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 1 | 0 | 0 | 1 | 0 | OIMM5 |||||  REGISTER X ||||

INSTRUCTION FIELDS:

REGISTER X FIELD - SPECIFIES REGISTER RX.
        0000 - REGISTER R0
        0001 - REGISTER R1
              ⋮
        1111 - REGISTER R15

OIMM5 FIELD - SPECIFIES IMMEDIATE VALUE TO BE SUBTRACTED FROM RX. NOTE THE ENCODING IS OFFSET BY 1 FROM THE ACTUAL VALUE TO BE SUBTRACTED.
        00000 - SUBTRACT 1
        00001 - SUBTRACT 2
              ⋮
        11111 - SUBTRACT 32

*FIG. 8*

INSTRUCTION FORMAT:

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| 0  | 0  | 0  | 1  | 0  | 1  | 0 | 0 | \multicolumn{4}{c}{REGISTER Y} | | | | \multicolumn{4}{c}{REGISTER X} | | | |

INSTRUCTION FIELDS:

REGISTER X FIELD — SPECIFIES SOURCE/DESTINATION REGISTER RX.
        0000 — REGISTER R0
        0001 — REGISTER R1
               ⋮
        1111 — REGISTER R15

REGISTER Y FIELD — SPECIFIES SOURCE REGISTER RY.
        0000 — REGISTER R0
        0001 — REGISTER R1
               ⋮
        1111 — REGISTER R15

*FIG. 9*

INSTRUCTION FORMAT:

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| 0  | 0  | 1  | 0  | 1  | 0  | 0 | \multicolumn{5}{c}{IMM5} | | | | | | \multicolumn{4}{c}{REGISTER X} | | | |

INSTRUCTION FIELDS:

REGISTER X FIELD — SPECIFIES SOURCE/DESTINATION REGISTER RX.
        0000 — REGISTER R0
        0001 — REGISTER R1
               ⋮
        1111 — REGISTER R15

IMM5 FIELD — SPECIFIES IMMEDIATE VALUE TO BE USED.
        00000 — 0
        00001 — 1
               ⋮
        11111 — 31

*FIG. 10*

METHOD AND APPARATUS FOR MANIPULATING A CARRY/BORROW BIT TO NUMERICALLY ADJUST AND IMMEDIATE VALUE OF AN INSTRUCTION DURING EXECUTION

FIELD OF THE INVENTION

The present invention relates in general to data processors, and more particularly to a method and apparatus for adjusting the range of a data processor instruction field.

BACKGROUND OF THE INVENTION

Microprocessors and microcontrollers generally use an instruction format that consists of an opcode followed by several predetermined fields. For most such data processors, the number of bits in each field, i.e. the length of each field, is limited. It is thus very important to get optimal use out of the bits that are available in each instruction bit field.

For example, for instructions which use an immediate value or an offset value, the range of values which is available is determined by the number of bits in the instruction field. For example, if five bits are available in an instruction field, then the values zero through thirty-one may be contained in that bit field. However, for selected instructions, the value zero may not be a particularly useful value. For example, an add instruction with the immediate data value of zero is equivalent to adding zero to a value. Since the result is the same as the starting number, the add immediate instruction using an immediate value of zero is equivalent to a no-operation instruction and is of limited or no value.

Some prior art data processors, such as the MC68030 processor available from Motorola, Inc. of Austin, Tex., provides an add instruction having an immediate bit field which is three bits long. The values one through seven have the immediate values of one through seven, whereas the value zero is used to represent an immediate value of eight. This gives a user the useful immediate data range of one to eight rather than zero through seven. However, the problem with this prior art method used to adjust the immediate data range is that the immediate data range must now be decoded in order to determine when the zero value is present. In addition, when the zero value is present in the immediate data field, then the value zero must be modified so that the value sent to the arithmetic unit is eight rather than zero. In some data processors the data input bus to the arithmetic unit has critical timing and is heavily loaded. Thus, the time required to decode a zero value in the immediate data field and to modify the immediate data field from a zero to another value and send that new value to the input of the arithmetic unit is a significant problem.

BRIEF DESCRIPTION OF THE DRAWINGS

FIG. 4 illustrates, in tabular form, the carry-in/borrow values used by various instructions of data processor 10 in accordance with one embodiment of the present invention;

FIG. 5 illustrates, in block diagram form, an instruction format of the ADD instruction of data processor 10 in accordance with one embodiment of the present invention;

FIG. 6 illustrates, in block diagram form, an instruction format of the ADDI instruction of data processor 10 in accordance with one embodiment of the present invention;

FIG. 7 illustrates, in block diagram form, an instruction format of the SUB instruction of data processor 10 in accordance with one embodiment of the present invention;

FIG. 8 illustrates, in block diagram form, an instruction format of the SUBI instruction of data processor 10 in accordance with one embodiment of the present invention;

FIG. 9 illustrates, in block diagram form, an instruction format of the RSUB instruction of data processor 10 in accordance with one embodiment of the present invention; and FIG. 10 illustrates, in block diagram form, an instruction format of the RSUBI instruction of data processor 10 in accordance with one embodiment of the present invention.

DESCRIPTION OF THE PREFERRED EMBODIMENTS

The present invention allows the range of a data processor instruction field to be adjusted without requiring decode of the instruction field and without requiring the instruction field value to be modified. In one embodiment of the present invention, data processor 10 of FIG. 1 uses the value of the carry-in/borrow bit provided to arithmetic unit 30 (see FIG. 2) to selectively adjust the range of the immediate operand provided by certain instructions (see FIGS. 4–10).

The terms "assert" and "negate" will be used when referring to the rendering of a signal, status bit, or similar apparatus into its logically true or logically false state, respectively. If the logically true state is a digital logic level one, the logically false state will be a digital logic level zero. And if the logically true state is a digital logic level zero, the logically false state will be a digital logic level one. The term "bus" will be used to refer to a plurality of signals which may be used to transfer one or more various types of information, such as data, addresses, control, or status. The symbol "%" preceding a number indicates that the number is represented in its binary or base two form.

DESCRIPTION OF THE FIGURES

Figure 1:
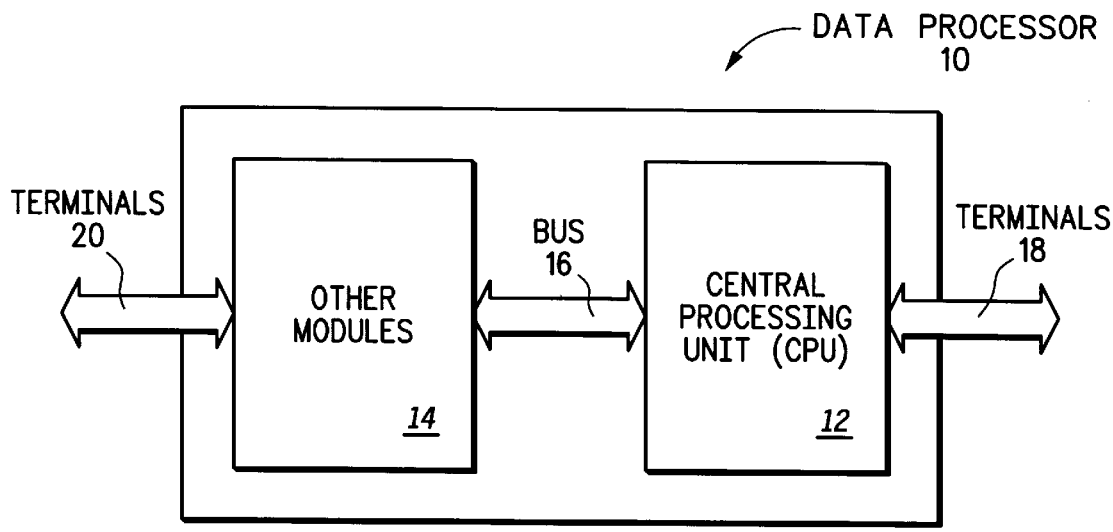
FIG. 1 illustrates, in block diagram form, a data processor 10 in accordance with one embodiment of the present invention.

FIG. 1 illustrates a data processor 10. In one embodiment, data processor 10 includes a central processing unit (CPU) 12 and other modules 14 which are coupled by way of bus 16. Other modules 14 may be coupled external to data processor 10 by way of terminals 20. Likewise, central processing unit 12 may be coupled external to data processor 10 by way of terminals 18. In one embodiment, terminals 18 and 20 may be integrated circuit pins, bumps, or other such conductors which couple an integrated circuit to the external world. In one embodiment, data processor 10 may be an integrated circuit such as a microcontroller. Some embodiments of data processor 10 may include other modules 14. Other modules 14 may include one or more on-chip peripherals such as timers, serial interfaces, memories of various types, analog-to-digital converters, various types of ports, and any other types of on-chip peripheral. In alternate embodiments of the present invention, data processor 10 may be a microprocessor which does not include any other modules 14.

Figure 2:
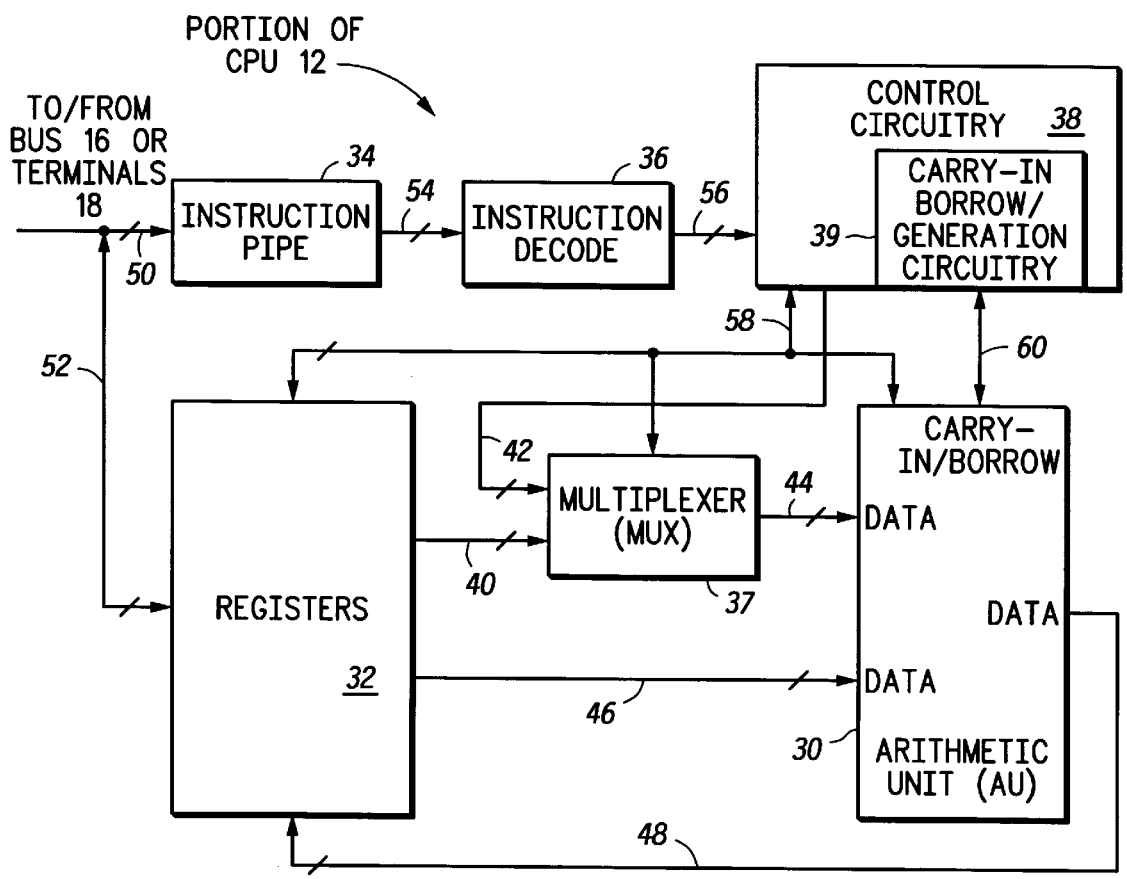
FIG. 2 illustrates, in block diagram form, a portion of central processing unit 12 of FIG. 1 in accordance with one embodiment of the present invention.

FIG. 2 illustrates a portion of central processing unit 12 of FIG. 1. In one embodiment, CPU 12 includes an instruction pipe 34 which receives instructions from bus 16 or terminals 18 by way of conductors 50. Alternate embodiments of the present invention may not have an instruction pipe 34, but instead, instructions may be provided directly to instruction decode circuitry 36. However, in the embodiment illustrated in FIG. 2, instruction 34 provides instructions to instruction decode circuitry 36 by way of conductors 54. Instruction decode circuitry 36 is coupled to control circuitry 38 by way of conductors 56.

Control circuitry 38 is bi-directionally coupled to registers 32, multiplexer (MUX) 37, and arithmetic unit (AU) 30 by way of conductors 58 to provide control signals. For example, control circuitry 38 provides register select signals to registers 32 to select which register or registers provide/ receive data to/from arithmetic unit 30. As another example, control circuitry 38 provides control signals to arithmetic unit 30 to indicate what type of operation should be performed by arithmetic unit 30. Note that arithmetic unit 30 may alternately be an arithmetic logic unit (ALU) or other type of processing circuitry which receives instruction operands and performs an operation.

Still referring to FIG. 2, control circuitry 38 includes carry-in/borrow generation circuitry 39 which is coupled to arithmetic unit 30 by way of conductors 60. Some embodiments of the present invention may provide the carry-in/ borrow information to the arithmetic unit using one signal which represent a carry-in for selected instructions (e.g. addition) and which represents a borrow for other instructions (e.g. subtraction). However, alternate embodiments of the present invention may provide a separate carry-in signal and a separate borrow signal from carry-in/borrow generation circuitry 39 to arithmetic unit 30. Note that some embodiments of the present invention may use only a carry signal, or may use only a borrow signal.

In the embodiment of the present invention illustrated in FIG. 2, control circuitry 38 provides an immediate data value to multiplexer 37 by way of conductors 42. However, an alternate embodiment of the present invention may provide this immediate data value from instruction decode 36 instead. Registers 32 provide register values to multiplexer 37 by way of conductors 40. Multiplexer 37 provides a data input to arithmetic unit 30 by way of conductors 44. Registers 32 also provide a second data input to arithmetic unit 30 by way of conductors 46. The data output of arithmetic unit is coupled to registers 32 by way of conductors 48. Registers 32 may receive and provide data to or from bus 16 or terminals 18 by way of conductors 52.

Figure 3:
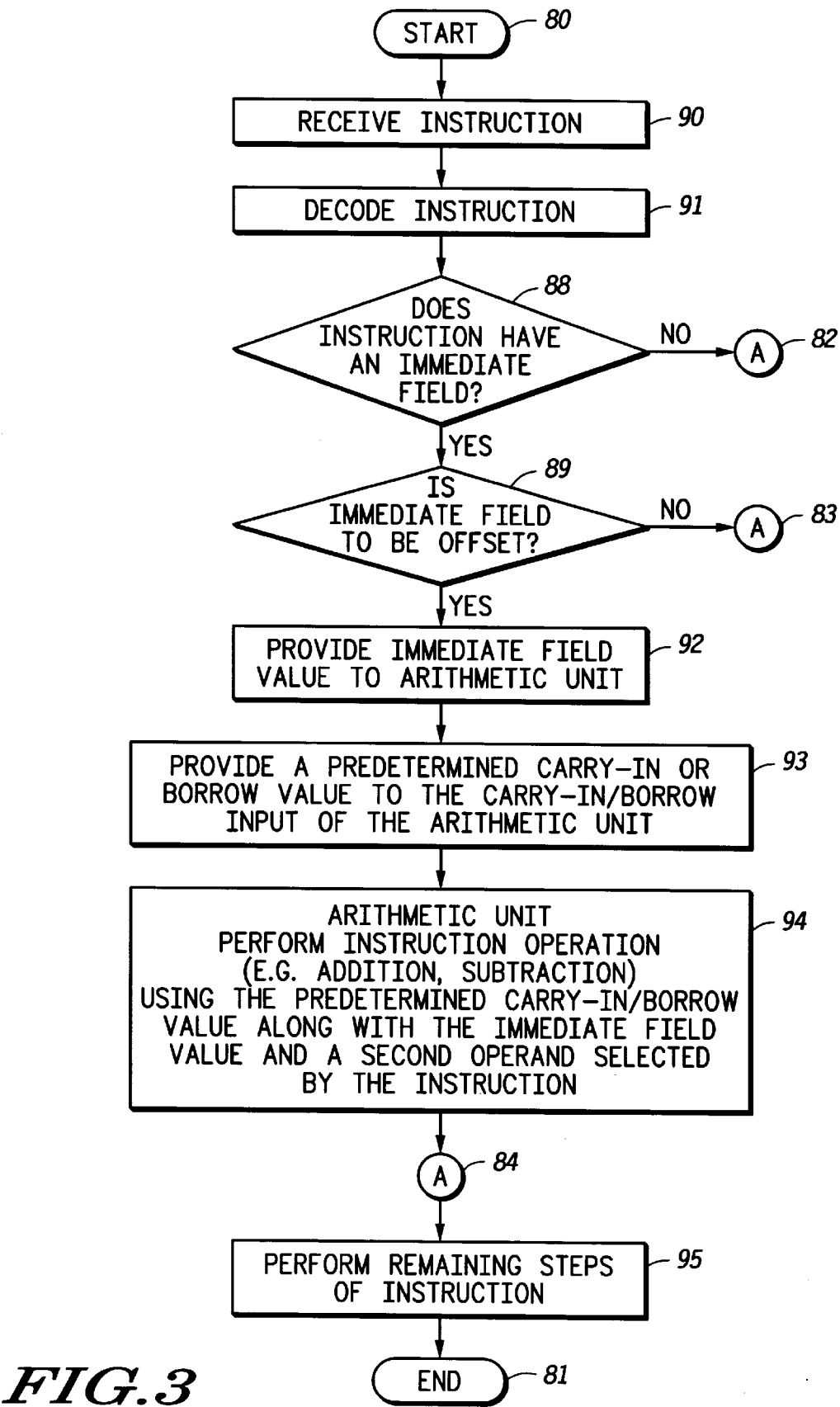
FIG. 3 illustrates, in flow diagram form, steps used to perform an instruction in data processor 10 in accordance with one embodiment of the present invention.

FIG. 3 illustrates, in flow diagram form, steps used to perform an instruction in data processor 10 in accordance with one embodiment of the present invention. Rectangles 90–95 represent steps which are performed to process an instruction. Oval 80 represent the starting point in performing the instruction, and oval 81 represents the finishing point in performing the instruction. Circle 84 represents a re-entry point in the flow, and circles 82–83 represent a transition to a re-entry point. Diamonds 88–89 represent decisional points in the flow. Alternate embodiments of the present invention may use a different or modified flow.

FIG. 4 provides information, including the carry-in/ borrow value, for selected instructions executed by data processor 10 of FIG. 1.

FIGS. 5–10 illustrate the instruction formats for the instructions listed in FIG. 2.

OPERATION OF THE PREFERRED EMBODIMENTS

The operation of the present invention will now be discussed. The present invention allows a field within an instruction to be offset by one without incurring a penalty in operation, bus timing, or circuitry. The present invention does away with having to decode and modify the immediate value stored in an instruction field. The present invention uses the carry-in/borrow generation circuitry (see circuitry 39 in FIG. 2) to selectively adjust the carry-in/borrow value provided to the arithmetic unit 30 based on the opcode of the instruction received by data processor 10.

Referring to FIG. 2, instruction decode circuitry 36 decodes the opcode portion of the received instruction in order to determine which instruction has been received. Instruction decode circuitry 36 also decodes any other portion of the instruction that require decoding. Instruction decode circuitry 36 then provides control signals to control circuitry 38 which are based upon the instruction received. The carry-in/borrow generation circuitry 39 receives a portion of these control signals and, based upon which instruction has been received, determines the value of the carry-in/borrow information to be provided to arithmetic unit 30 by way of conductor 60.

As an example, referring to FIG. 4, when instruction decode circuitry 36 decodes an ADD instruction, the carry-in/borrow generation circuitry 39 determines that a carry-in/borrow value of zero should be provided to arithmetic unit 30 by way of conductor 60. However, if instruction decode circuitry 36 receives an ADDI (add immediate) instruction, carry-in/borrow generation circuitry 39 determines that a carry-in/borrow value of one should be provide to arithmetic unit 30 by way of conductor 60. By adjusting the carry-in/borrow value provided to arithmetic unit 30, carry-in/borrow circuitry 39 is able to adjust the range of the immediate data from a range of 0 to N to a new range of 1 to (N+1) without the need to decode the immediate value field.

The adjusting or offsetting of the immediate data range is particularly useful for arithmetic instructions where the zero value would have no effect, such as in add immediate or subtract immediate instructions where the immediate data value is a zero. Note that for some embodiments of a reverse subtract instruction, there may be no need for the carry-in/ borrow generation circuitry 39 to change the value of the carry-in/borrow bit. (i.e. referring to FIG. 4, the RSUB instruction and the RSUBI instruction both use a carry-in/ borrow value of one). Which instructions alter the carry-in/ borrow bit 60 to adjust the immediate data value is a design decision and may vary for different embodiments of the present invention.

Although the instructions listed in FIG. 4 are all arithmetic instructions, the present invention may also be useful for any type of instruction field in which the range of a bit field is to be adjusted. Note that in alternate embodiments of the present invention, the carry-in/borrow value provided by carry-in/borrow generation circuitry 39 may be provided to any bit in arithmetic unit 30. For example, the standard carry-in/borrow bit is provided to the least significant bit of arithmetic unit 30. However, in alternate embodiments of the present invention, the carry-in/borrow bit may be provided to any of the bits of arithmetic unit 30. Thus, the carry-in/ borrow signal 60 provided to arithmetic unit 30 may alternately be considered to be an adjust signal affecting the computation performed by arithmetic unit 30.

Referring to FIG. 3, step 90 illustrates the step of receiving an instruction by either instruction pipe 34 or instruction decode circuitry 36. Note that the data processor instructions may be stored and provided to bus 16 from other modules 14 or from external program storage (not shown) via terminals 18. Step 91 illustrates a step of decoding the instruction by instruction decode circuitry 36. Referring to decision diamond 88, if the instruction does not have an immediate field, then the flow continues at circle 84. Referring to decision diamond 89, if the immediate field is not to be offset, then the flow continues at circle 84. Step 92 illustrates the step of providing an immediate value to arithmetic unit 30. Note that the present invention does not require any adjustment to the immediate data value provided in the instruction field. Thus, this immediate value may be provided to arithmetic unit 30 directly from instruction decode circuitry 36 or may be provided from control circuitry 38. The prior art required the modification of the immediate value zero before the immediate value was provided to the arithmetic unit.

Step 93 illustrates the step of providing a predetermined carry-in or borrow value to the carry-in/borrow input of the arithmetic unit 30. Carry-in/borrow generation circuitry 39 receives decoded control signals from instruction decode circuitry 36 by way of conductors 56 and determines the value of the carry-in/borrow bit to be provided to arithmetic unit 30 by way of conductor 60. In the present invention, the carry-in/borrow value is different for the add and subtract instructions depending on whether the instruction includes an immediate field or not. (See FIG. 4.) Step 94 illustrates the step of the arithmetic unit 30 performing the instruction operation, for example, an addition or subtraction, using the predetermined carry-in/borrow value along with the immediate field and a second operand selected by the instruction. Note that the value of the carry-in/borrow bit provided to the arithmetic unit 30 is determined by carry-in/borrow generation circuitry 39. Step 95 illustrates that the remainder of the instruction is then performed.

Referring to FIGS. 5 through 10, although the instruction format has been shown using a specified number of bits, alternate embodiments of the present invention may use any type of instruction format with the various fields having any length. For example, alternate embodiments of the instruction may use more or less than seven bits for the opcode. In addition, the opcode may be located somewhere other than bits 9 through 15. Similarly, referring to FIG. 6, although the immediate field is shown as five bits located in bits 4 through 8, alternate embodiments of the present invention may use any number of bits and may located them anywhere in the instruction format. In addition, alternate embodiments of the present invention may use a bit field in the instruction indicating offset or other control or data values which may have their range adjusted using the present invention. Alternate embodiments of the present invention may use different opcodes for the instructions illustrated in FIGS. 4–10. In addition, alternate embodiments of the present invention may use any type of instruction, not just the specific types of addition and subtraction instruction instructions illustrated in FIGS. 4–10.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

We claim:

1. A method of performing a function encoded as a processor instruction containing an opcode field, an biased immediate value field, and a nonimmediate operand field, said method comprising the steps of:

identifying the processor instruction, and an initial immediate value;

altering the initial immediate value to a biased immediate value that is not equal to the initial immediate value;

placing the processor instruction and the biased immediate value into memory for execution;

beginning execution of the processor instruction by decoding the processor instruction, the decoding comprising the steps of:
      identifying the processor instruction based on the opcode field,
      providing the biased immediate value from the immediate value field of the processor instruction, and
      providing a nonimmediate operand specifier from the nonimmediate operand field;

providing a carry-in/borrow signal based on the processor instruction identified, the carry in/borrow signal being set to a value that adjusts the biased immediate value to a correct immediate value;

retrieving a nonimmediate operand in response to providing the nonimmediate operand specifier; and performing the function in response to decoding of the processor instruction utilizing the nonimmediate operand, the corrected immediate value, and the carry-in/borrow signal as inputs and generating an output data, wherein:

the carry-in/borrow signal is used to perform a first adjustment to obtain the corrected immediate value from the biased immediate value and the corrected immediate value is used to perform a second adjustment to obtain a final result from the nonimmediate operand and the corrected immediate value.

2. The method in claim 1 wherein:

the function is an add function, the processor instruction identifies an add immediate instruction, and the performing effectively increments the biased immediate value by one to form the corrected immediate value.

3. The method in claim 2 wherein:

the carry-in/borrow signal is asserted to alter the biased immediate value to the corrected immediate value.

4. The method in claim 2 wherein:

the add immediate instruction is a sixteen bit instruction consisting of:
      the opcode field consisting of seven bits with a binary value of %0010000,
      the immediate value field consisting of five bits, and
      a nonimmediate operand field consisting of four bits to identify the nonimmediate operand contained in one of a plurality of registers.

5. The method in claim 2 wherein:

the add immediate instruction has an mnemonic of "addi" and both the nonimmediate operand and the output data are located in a single register identified by the nonimmediate operand field.

6. The method in claim 1 wherein:

the function is a subtract function, the processor instruction identifies a subtract immediate instruction, and the performing effectively decrements a negated immediate value by one to form the corrected immediate value.

7. The method in claim 6 wherein:

the carry-in/borrow signal is negated to alter the biased immediate value to the corrected immediate value.

8. The method in claim 6 wherein:
the subtract immediate instruction is a sixteen bit instruction consisting of:
   the opcode field consisting of seven bits with a binary value of %0010010,
   the immediate value field consisting of five bits, and
   a nonimmediate operand field consisting of four bits to identify the nonimmediate operand contained in one of a plurality of registers.

9. The method in claim 6 wherein:
the subtract immediate instruction has an mnemonic of "subi" and both the nonimmediate operand and the output data are located in a single register identified by the nonimmediate operand field.

10. The method in claim 1 wherein:
a value of the carry-in/borrow signal is opposite that generated for a similar function without an immediate operand.

11. A data processing system responsive to a processor instruction containing an immediate value field that represents an effective immediate value differing by a predetermined nonzero integer from a binary value encoded in the immediate value field, said data processing system comprising:
   means for accepting the effective immediate value and altering the effective immediate value to the binary value that is to be encoded in the immediate value field;
   an instruction decode circuitry for identifying the processor instruction from an opcode field in the processor instruction and decoding the processor instruction to identify the immediate value field and a nonimmediate operand field when the processor instruction has been selected for execution by the data processing system,
   an immediate value provision circuitry that provides the binary value encoded in the immediate value field;
   a plurality of registers that provides contents of a selected one of the plurality of registers as a set of nonimmediate operand signals in response to a register select signal generated from the nonimmediate operand field;
   a carry-in/borrow generation circuitry that generates a carry-in/borrow signal based on which instruction is identified; and
   an arithmetic unit operating responsively to the binary value encoded in the immediate value field, the set of nonimmediate operand signals, and the carry-in/borrow signal, wherein the effective immediate value is generated from the binary value encoded in the immediate value field and the carry-in/borrow signal and wherein this effective immediate value is processed with the nonimmediate value to provide a set of output data signals.

12. The data processing system in claim 11 wherein:
the processor instruction is an add immediate instruction.

13. The data processing system in claim 12 wherein:
the carry-in/borrow signal is asserted in response to identification of the add immediate instruction.

14. The data processing system in claim 12 wherein:
the add immediate instruction is a sixteen bit instruction consisting of:
   the opcode field consisting of seven bits with a binary value of %0010000,
   the immediate value field consisting of five bits, and
   the nonimmediate operand field consisting of four bits to identify a nonimmediate operand contained in a source operand register.

15. The data processing system in claim 12 wherein:
the add immediate instruction has an mnemonic of "addi" and the set of output data signals is stored in the selected one of the plurality of registers.

16. The data processing system in claim 11 wherein:
the processor instruction is an subtract immediate instruction.

17. The data processing system in claim 16 wherein:
the carry-in/borrow signal is negated in response to identification of the subtract immediate instruction.

18. The data processing system in claim 16 wherein:
the subtract immediate instruction is a sixteen bit instruction consisting of:
   the opcode field consisting of seven bits with a binary value of %0010010,
   the immediate value field consisting of five bits, and
   the nonimmediate operand field consisting of four bits to identify a nonimmediate operand contained in a source operand register.

19. The data processing system in claim 16 wherein:
the subtract immediate instruction has an mnemonic of "subi" and the set of output data signals is stored in the selected one of the plurality of registers.

20. The data processing system in claim 11 wherein:
a value of the carry-in/borrow signal is opposite that generated for a similar function without an immediate operand.

21. A data processing system responsive to a first processor instruction containing an immediate value field that represents an effective immediate value differing by a predetermined nonzero integer from a binary value encoded in the immediate value field, and a second processor instruction containing a first operand field and a second operand field, wherein the first processor instruction and the second processor instruction implement a same function, said data processing system comprising:
   an instruction decode circuitry for identifying and decoding the first processor instruction into the immediate value field and a nonimmediate operand field when the first processor instruction has been selected for execution by the data processing system, and for identifying and decoding the second processor instruction into the first operand field and the second operand field when the second processor instruction has been selected for execution by the data processing system,
   an immediate value provision circuitry that provides a set of immediate value signals from the immediate value field;
   a plurality of registers that provides a value of a selected one of the plurality of registers as a set of nonimmediate operand signals in response to a register select signal generated from either the nonimmediate operand field or the first operand field;
   a carry-in/borrow generation circuitry that generates a carry-in/borrow signal based on which processor instruction is identified;
   a multiplexer selecting as a set of multiplexer signals one of a set of signals comprising:
      the set of immediate value signals, and
      a set of signals generated in response to decoding the second operand field; and
   an arithmetic unit operating responsively to the set of multiplexer signals, the set of nonimmediate operand signals, and the carry-in/borrow signal to generate a set of output data signals, wherein:

the carry-in/borrow signal is utilized to effectively adjust a value represented by the set of multiplexer signals by the predetermined nonzero integer to form the effective immediate value when the first processor instruction is identified, and the value of the carry-in/borrow signal differs between execution of the first processor instruction and execution of the second processor instruction.

22. The data processing system in claim 21 wherein:
the first processor instruction is an add instruction with an immediate operand, and
the second processor instruction is an add instruction without the immediate operand.

23. The data processing system in claim 22 wherein:
the carry-in/borrow signal is asserted for the add instruction with the immediate operand, and
the carry-in/borrow signal is negated for the add instruction without an immediate operand.

24. The data processing system in claim 21 wherein:
the first processor instruction is a subtract instruction with an immediate operand, and
the second processor instruction is a subtract instruction without the immediate operand.

25. The data processing system in claim 24 wherein:
the carry-in/borrow signal is negated for the subtract instruction with the immediate operand, and
the carry-in/borrow signal is asserted for the subtract instruction without an immediate operand.

26. A data processing system responsive to an add immediate instruction containing an immediate value field that represents an effective immediate value one larger than a binary value encoded in the immediate value field, said data processing system comprising:
an instruction decode circuitry for identifying the add immediate instruction from an opcode field in the add immediate instruction and decoding the add immediate instruction into an immediate value field and a nonimmediate operand field when the add immediate instruction has been selected for execution by the data processing system,
an immediate value provision circuitry that provides a set of immediate value signals from the immediate value field;
a plurality of registers that provides contents of a selected one of the plurality of registers as a set of nonimmediate operand signals in response to a register select signal generated from the nonimmediate operand field;
a carry-in/borrow generation circuitry that asserts a carry-in/borrow signal when the add immediate instruction is identified; and
an arithmetic unit operating to effectively add the effective immediate value to a value formed from the set of nonimmediate operand signals, and generating a sum as a set of output data signals, wherein:
asserting the carry-in/borrow signal effectively adds one to a value represented by the set of immediate value signals to form an effective immediate operand.

27. The data processing system in claim 26 wherein:
the add immediate instruction is a sixteen bit instruction consisting of:
the opcode field consisting of seven bits with a binary value of %0010000,
the immediate value field consisting of five bits, and
a nonimmediate operand field consisting of four bits to identify a nonimmediate operand contained in one of the plurality of registers.

28. A data processing system responsive to an subtract immediate instruction containing an immediate value field that represents an effective immediate value one larger than a binary value encoded in the immediate value field, said data processing system comprising:
an instruction decode circuitry for identifying the subtract immediate instruction from an opcode field in the subtract immediate instruction and decoding the subtract immediate instruction into an immediate value field and a nonimmediate operand field when the subtract immediate instruction has been selected for execution by the data processing system,
an immediate value provision circuitry that provides a set of immediate value signals from the immediate value field;
a plurality of registers that provides contents of a selected one of the plurality of registers as a set of nonimmediate operand signals in response to a register select signal generated from the nonimmediate operand field;
a carry-in/borrow generation circuitry that negates a carry-in/borrow signal when the subtract immediate instruction is identified; and
an arithmetic unit operating to effectively subtract the effective immediate value from a value formed from the set of nonimmediate operand signals, and generating a difference as a set of output data signals, wherein:
negating the carry-in/borrow signal effectively adds one to a value represented by the set of immediate value signals to form an effective immediate operand.

29. The data processing system in claim 28 wherein:
the subtract immediate instruction is a sixteen bit instruction consisting of:
the opcode field consisting of seven bits with a binary value of %0010010,
the immediate value field consisting of five bits, and
a nonimmediate operand field consisting of four bits to identify a nonimmediate operand contained in one of the plurality of registers.

30. A data processing system for performing a function encoded as a processor instruction containing an opcode field, an immediate value field, and a nonimmediate operand field, said data processing system comprising:
means for decoding the processor instruction, comprising:
means for identifying the processor instruction based on the opcode field,
means for providing an immediate value from the immediate value field of the processor instruction, and
means for providing a nonimmediate operand specifier from the nonimmediate operand field;
means for providing a carry-in/borrow signal based on the processor instruction identified;
means for retrieving a nonimmediate operand in response to providing the nonimmediate operand specifier; and
means for performing the function in response to decoding of the processor instruction utilizing the nonimmediate operand, the immediate value, and the carry-in/borrow signal as inputs and generating an output data, wherein:
the carry-in/borrow signal is used to adjust the immediate value by a predetermined nonzero integer to form an effective immediate value different from the immediate value.

* * * * *